United States Patent

[11] 3,526,239

[72] Inventor August Oroza
 Tustin, California
[21] Appl. No. 413,801
[22] Filed Nov. 25, 1964
[45] Patented Sept. 1, 1970
[73] Assignee Robertshaw Controls Company
 Richmond, Virginia
 a corporation of Delaware

[54] OXYGEN DILUTER SYSTEM
 10 Claims, 3 Drawing Figs.
[52] U.S. Cl...................................................... 137/81,
  137/114; 138/46; 128/142.2
[51] Int. Cl...................................................... A62b 9/02
[50] Field of Search........................................... 137/63R,
  63, 64, 604; 128/142, 142.2, 202, 203; 137/81,
  111, 114; 138/46

[56] References Cited
UNITED STATES PATENTS
2,269,500 1/1942 Wildhack..................... 128/191

2,616,442 11/1952 Holmes........................ 128/142X
FOREIGN PATENTS
471,385 2/1929 Germany..................... 128/203
724,929 2/1955 Great Britain............. 128/203
126,236 6/1959 U.S.S.R...................... 137/63(R)UX Primary Examiner—William F. O'Dea
Assistant Examiner—R. Gerard
Attorney—Auzville Jackson, Jr., Robert L. Marben and Anthony A. O'Brien ABSTRACT: An oxygen diluter system for breathing apparatus including a demand type regulator for the oxygen flow, valve means controlling the air flow, a mixture chamber for the oxygen and air flows, and a variable nozzle controlling the flow of oxygen into the mixture chamber so as to effect a jet velocity resulting in a corresponding variable pressure condition in the mixture chamber to actuate the air flow valve means.

Patented Sept. 1, 1970

3,526,239

INVENTOR
AUGUST OROZA

BY Anthony A. O'Brien

ATTORNEY

OXYGEN DILUTER SYSTEM

The present invention relates to breathing apparatus and, more particularly, to an oxygen regulator and diluter system of the type utilized in high altitude and space flights.

Some aircraft oxygen systems presently used in high altitude flying provide 100 percent oxygen from the moment they are put in use; however, from both a physiological viewpoint and an economical viewpoint regarding oxygen consumption during long flights, it is highly desirable to furnish automatically a varying proportion of oxygen as a function of altitude. There are certain conventional systems now in use including panel mounted regulator systems as well as man mounted regulator systems which provide for dilution of oxygen and air in a varying proportion in accordance with atmospheric pressure variations, i.e., from a proportion of 100 percent oxygen and 0 percent air under high altitude flight conditions where 100 percent oxygen is required for breathing purposes to a proportion of 0 percent oxygen to 100 percent air under low altitude flight conditions where only normal air is needed for breathing purposes.

The basic problem of dilution has been approached by injecting air into a mixing chamber and includes a nozzle for the oxygen flow. However, in a demand type regulator system, the regulator fails to achieve peak flow and the overall stability of the system is adversely affected because the nozzle back pressure, i.e., the nozzle restriction downstream of the main demand valve increases the nozzle back pressure. In order to obtain adequate dilution ratios, the amount of nozzle restriction is high by necessity but when operating on a 100 percent oxygen flow, this downstream restriction impedes the flow and produces the nozzle back pressure resulting in severe oscillations.

It is, therefore, an object of the present invention to eliminate oscillations in an oxygen diluter system of the air injector type.

Another object of this invention is to proportion the flow of oxygen as a function of atmospheric pressure in an oxygen diluter system of the air injector type without undue restriction of the oxygen flow.

This invention has another object in that a variable orifice controls oxygen flow in an oxygen diluter system of the air injector type.

The present invention has another object in that a variable area nozzle in an oxygen diluter system varies its cross sectional flow area as a function of oxygen flow over the entire dilution range where the oxygen flow varies as a function of demand sensed by a demand oxygen regulator.

It is another object of the present invention to contour the poppet of variable area nozzle in an oxygen diluter system so that the contour profile produces the injection effect for drawing air into the system.

A further object of the present invention is to dampen vibrations in a variable nozzle arrangement of the piston-cylinder type in an oxygen diluter system of the air injector type.

The present invention has a still further object in that a variable nozzle automatically varies it cross sectional flow area in response to oxygen flow in an oxygen diluter system to provide a considerable jet velocity having a high injector efficiency with a large air drawing power at increasing rates of flow within dilution ranges.

In accordance with the present invention, a preferred embodiment of an oxygen diluter system for breathing apparatus includes oxygen regulating means for regulating an oxygen flow in accordance with demand, air control means for controlling an air flow as a function of atmospheric pressure, a mixture chamber for mixing the oxygen and air flows, and orifice means operatively disposed downstream of the oxygen regulating means and being automatically varied as a function of the oxygen flow.

Other objects and advantages of the present invention will become apparent from the following description of a preferred embodiment, taken in connection with the accompanying drawing wherein.

Figure 1:
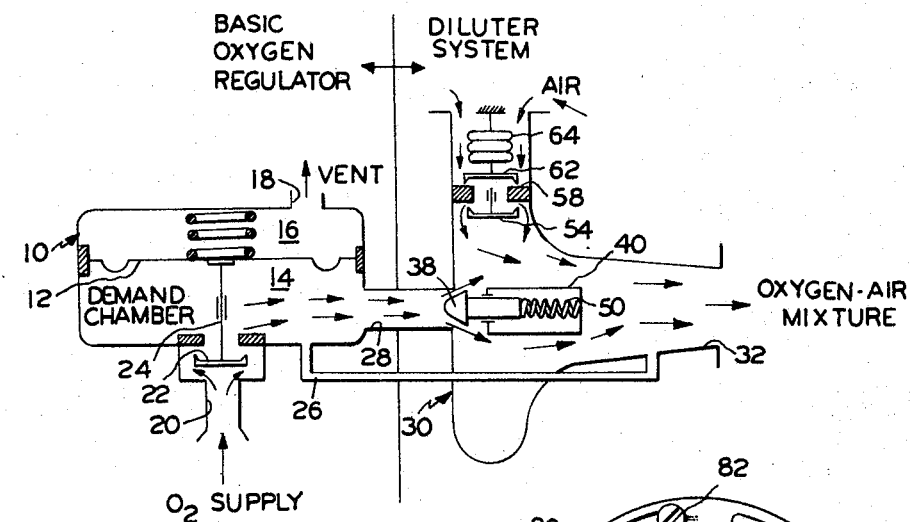
FIG. 1 is a schematic diagram of an oxygen diluter system embodying the present invention.

With reference to FIG. 1 of the drawing, a basic oxygen regulator device of the demand type includes a hollow body 10 having a peripherally sealed diaphragm 12 separating the body 10 into two chambers 14 and 16. The chamber 16 is vented at 18 to the atmosphere to define an atmospheric chamber and the chamber 14 has an inlet port 20 which is connected to a suitable oxygen supply.

Adjacent the inlet port 20, a valve member 22 controls the flow of oxygen into the chamber 14; a valve stem 24 has one end connected to the valve element 22 and an opposite end connected to one side of the diaphragm 12, which may be inherently spring biased or which may be provided with a biasing spring in the chamber 16 acting on the other side of the diaphragm. Movement of valve element 22 is effected by a pressure differential between chambers 14 and 16; such differential varies in accordance with atmospheric pressure in chamber 16 and in accordance with oxygen pressure variations established by demand of the user. Chamber 14 is thus designated as a demand chamber and has a demand sensing port 26 and an outlet port 28.

The diluter part of the breathing apparatus control includes a hollow casing 30 having an outlet 32 adapted to be connected to the breathing device such as a helmet or face mask (not shown). The outlet 32 extends from a mixture chamber 34 which communicates with the demand chamber outlet port 28 by means of an opening or orifice 36. Oxygen flow through the orifice 36 is varied by a properly contoured poppet 38 formed on one end of a hollow, cylindrical stem 40 that is opened on its opposite end. The stem 40 extends through the open end of an aligned cylinder 42 which is centrally supported by a plurality of spider arms 44 spaced about the outer wall of cylinder 42 and attached to the adjacent internal wall portions of casing 30. The spider arms 44 are properly contoured to provide streamline flow therearound. Opposite its opened end, the cylinder 42 is closed by a bottom wall 46 having a central aperture suitably threaded to receive the threaded end of an adjusting rod 48. The adjusting rod 48 extends into the cylindrical space defined by the stem 40 and cylinder 42; a coil spring 50 encircles the inner end of adjusting rod 48 and is mounted in compression between the inner surface of poppet 38 and a fixed collar on the rod 48. With such an arrangement the biasing force of the coil spring 50 may be adjusted by rotation of the adjusting rod 48 which is located on a longitudinal axis defined by the centrally aligned axis of the outlet 32, the mixture chamber 34 and the orifice 36.

Figure 3:
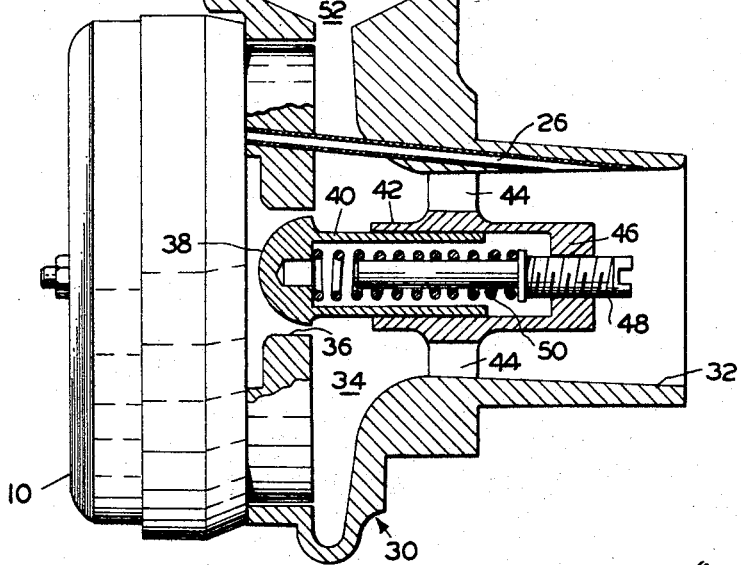
FIG. 3 is a partial cross section of a breathing apparatus control embodying the system of FIG. 1.

As is illustrated in FIG. 3, the mixture chamber 34 communicates with an air flow chamber 52 which is controlled by a one-way check valve 54 being made of suitable flexible material so as to be pressure responsive. The valve 54 is centrally attached to a ported valve plate 56 that is securely fastened to a shoulder 58 formed in an internal wall portion of casing 30. The ported valve plate 56 separates the air flow chamber 52 from an air chamber 60 and air flow therethrough is controlled by the valve 54 in accordance with a differential pressure between chamber 52 and chamber 60. In addition to the one-way check valve 54, the ported valve plate 56 is separately controlled by a valve disc 62 secured to the bottom wall of an aneroid bellows 64. The top wall of bellows 64 carries an adjusting screw 66 which is threaded through a suitably threaded opening centrally disposed on a fixed cover plate 68. The bellows 64 thus has one end adjustably fixed in the chamber 60 and an opposite end with valve 62 thereon being movable relative to the valve plate 56 in response to atmospheric pressure variations in the chamber 60.

Figure 2:
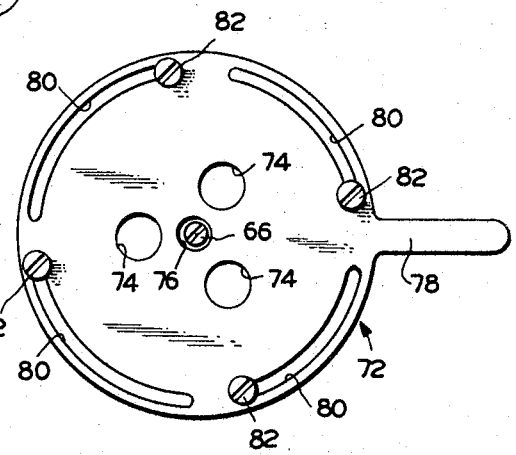
FIG. 2 is a top view of a part of FIG. 3.

The cover plate 68 is provided with three equally circumferentially spaced air inlet openings 70 (only one being shown in FIG. 3) which are controlled by a manually movable closure plate 72. As shown in FIG. 2, the closure plate 72 is provided with three equally circumferentially spaced air ports 74 which are alignable with the inlet openings 70 in the fixed cover plate 68. A central opening 76 in the closure plate 72 permits access to the adjusting screw 66 and defines an axis of rotation for the closure plate 72 which is rotated by a lever arm 78 projecting radially outwardly from the circumference thereof. Adjacent its periphery, the closure plate 72 is provided with a plurality (four) of arcuate slots 80 and a similar plurality (four) of headed fasteners 82 which have threaded shanks (not shown) extending freely through their respective slots 80. The heads of the threaded fasteners 82 are larger than the width of the slots 80 and the threaded shanks extend through aligned openings in the fixed cover plate 68 and terminate in threaded bores (not shown) in a flange portion of the casing 30. The threaded fasteners frictionally clamp the closure plate 72 to the fixed cover plate 68 to prevent accidental movement thereof; however, the closure plate 72 may be moved by the manual lever 78 whereby the closure plate 72 slides on the fixed cover plate 68 for selectively positioning the air ports 74 in and out of registry with the inlet openings 70.

In the following description of a sequence of operation of the present invention, it is to be noted that any suitable type of basic oxygen regulator control may be utilized and the schematic arrangement of such control has been over-simplified in FIG. 1 for the sake of brevity. Accordingly, it is assumed that an oxygen regulator of the demand type is being used; i.e., the oxygen valve 22 is opened and closed in accordance with the demand sensed at the regulator's demand chamber 14 whereby the control position of the oxygen valve 22 is accordingly varied with inhalation and exhalation at the face mask. Thus, the flow of oxygen is zero at the start of inhalation, rises to a maximum during inhalation, then decreases to zero and remains zero during exhalation.

Assuming now that there is no demand for oxygen, the oxygen valve 22 is closed and the atmospheric pressure in aneroid chamber 60 causes contraction of the bellows 64 whereby the valve disc 62 is displaced from the ported valve plate 56. Under such conditions, the controlling components are positioned as shown in FIG. 3, i.e., since there is no oxygen flow, the poppet 38 is biased to its extreme position of substantially closing the orifice 36. During inhalation at the face mask, the pressure in chamber 52 is decreased and the differential pressure between chambers 60 and 52 causes the one-way valve 54 to open and air is drawn through the aligned openings 74 and 70, chamber 60, ported valve plate 56 and chamber 52 to the mixture chamber 34; thus 0 percent oxygen and 100 percent air is delivered to the outlet 32. As is well known in the art, the face mask includes some form of exhalation valve to expel exhaled air to the atmosphere rather than back through the outlet 32. Such exhalation increases the pressure in chamber 52 so that the valve 54 closes the ported valve plate 56.

Under conditions of high altitude where 100 percent oxygen is needed, the atmospheric pressure in chamber 60 causes expansion of bellows 64 whereby the valve disc 62 closes the ported valve plate 56 so there is no air flow. At the same time the oxygen valve 22 is positioned in response to inhalation and exhalation at the face mask. During such conditions, 0 percent air and 100 percent oxygen is delivered from the chamber 14 and through the orifice 36 and the pressure of such flow displaces the poppet 38 against the bias of the coil spring 50 so that there is substantially no restriction downstream of the demand chamber 14.

Turning now to conditions of an intermediate altitude or conditions of a varying altitude, the oxygen regulator device 10 supplies a flow of oxygen to outlet port 28 as a function of the face mask demand and the air inlet control valve 62 is opened by the contraction of bellows 64 in response to atmospheric pressure. The pressure of the oxygen flow acting on the contoured poppet head 38 moves the piston stem 40 inwardly in the cylinder 42 which guides such stem movement; should there by any abrupt changes or line pressure variations, the coil spring 50 acts as a damper to prevent oscillation or hunting of the head 38 in the orifice 36 and to assure a smooth stable movement of the head 38 in automatically responding to the oxygen flow. Movement of the hemi-spherically contoured head 38 varies the cross-sectional flow area of the orifice 36 and the head 38 is contoured in such a manner that under the influence of the forces acting on it by the pressure differential, the hydrodynamic forces and the spring force, the piston 38—40 seeks a balanced position. In such balanced position, the hemi-sperical contour on the head 38 results in a high velocity jet of oxygen flow into the mixture chamber 34. The high velocity jet causes a reduced pressure in the chamber 52 whereby the one-way valve 54 is flexed to an open position and air is induced to flow through the ported valve plate 56 and into the mixture chamber 34 where it is entrained with the oxygen flow; the mixture then flows through the outlet 32 for supplying the breathing apparatus.

As the oxygen flow increases and the pressure downstream of the regulator valve correspondingly increases, the piston 38—40 attains a new equilibrium position which by the hemi-spherical profile of head 38 increases the flow area of the orifice 36 whereby the velocity of the jet is maintained without appreciable change in back pressure. When the demand of oxygen in the regulator sensing conduit 26 determines that the regulator 10 must deliver a large quantity of oxygen, such as when there is no air flow through the ported valve plate 56, the poppet head 38 senses the large increase in force due to nozzle back pressure and responds by increasing the flow area of orifice 36; thus the pressure downstream of the regulator's demand valve is relieved and the regulator attains full flow capacity free of oscillation.

In the above arrangement the orifice 36 and the biased piston 38—40 with its slide guide constitutes a variable area nozzle assembly which responds automatically to oxygen flow from the demand regulator 10 for establishing a high velocity jet flow that produces the air injection effect necessary to provide dilution over the entire range of dilution proportions. By establishing a high jet velocity, the variable area nozzle obtains large air drawing power at increasing rates of flow within the range desired for dilution levels at a relatively high injector efficiency because the unfavorable conditions of high nozzle back pressure is minimized. The above arrangement presents the additional advantage in that when high flows of oxygen are required and the dilution system is no longer required (as at high altitudes), the nozzle is practically removed from the system due to the increased flow area at the orifice and the practically unrestricted flow of 100 percent oxygen to the outlet 32.

In accordance with the present invention, the oxygen diluter system may be manually controlled to provide 100 percent oxygen regardless of altitude or atmospheric pressure. In such an instance, the manually operated lever 78 is rotated clockwise as viewed in FIG. 2 to a position where the fasteners 82 engage the opposite edges of the corresponding slots 80; thus the ports 74 are moved out of registry with the openings 70 and the flow of air to the aneroid chamber 60 is cut-off. The system then operates as described above when valve 62 cuts off the intake air flow and 100 percent oxygen is delivered to the outlet 32.

Inasmuch as the preferred embodiment of the present invention is subject to many variations, modifications and changes in detail, it is intended that all matter contained in the foregoing description or shown on the accompanying drawing shall be interpreted as illustrative and not in a limiting sense.

I claim:

1. In an oxygen diluter system for breathing apparatus, the combination comprising:

oxygen regulating means having demand valve means for regulating an oxygen flow in accordance with oxygen demand variations;

means defining a mixture chamber for mixing an air flow with the oxygen flow;

air control means having first valve means operative in response to atmospheric pressure variations for controlling an air flow and second valve means operative in response to pressure conditions of the oxygen flow in the mixture chamber;

variable nozzle means automatically controlling the oxygen flow into the mixture chamber in response to pressure variations of the oxygen flow from the demand valve means; and said variable nozzle means controlling the oxygen flow into the mixture chamber in a manner to effect a variable jet velocity resulting in a corresponding variable pressure condition in the mixture chamber for actuating said second valve means.

2. The combination as recited in claim 1 wherein said variable nozzle means includes an orifice opening and a nozzle head movable to vary the flow area of the orifice opening.

3. The combination as recited in claim 2 wherein said nozzle head has a hemi-spherical contour.

4. In an oxygen diluter system for breathing apparatus, the combination comprising:

an oxygen regulator having oxygen flow inlet and outlet ports and demand valve means for regulating an oxygen flow therebetween in accordance with oxygen demand variations;

an air diluter casing having a mixture chamber and outlet means adapted to be connected to breathing apparatus;

intake air control means having pressure responsive valve means for controlling an air flow in response to atmospheric pressure variations and having injector valve means downstream of said pressure responsive valve means for controlling the air flow to said mixture chamber;

variable orifice means in said casing automatically varying the velocity of the oxygen flow into said mixture chamber; and said injector valve means being actuated from its closed position in accordance with pressure variations accompanying the velocity variations of the oxygen flow in said mixture chamber.

5. The combination as recited in claim 4 wherein said variable orifice means includes an orifice defining a flow area and nozzle head means being automatically positioned relative to the orifice in response to the oxygen flow through the flow area, said nozzle head means being movable through a plurality of positions corresponding to a range of oxygen-air dilution proportions from 0 percent oxygen and 100 percent air to 100 percent oxygen and 0 percent air whereby the flow area is varied through a corresponding range from a substantially full restricted flow area for a 0 percent oxygen flow to a substantially unrestricted flow area for a 100 percent oxygen flow.

6. The combination as recited in claim 5 wherein said intake air control means further comprises manually operated means for selectively cutting off air flow to the mixture chamber.

7. The combination as recited in claim 4 wherein said variable orifice means includes an orifice opening and nozzle head means movable to vary the flow area of the orifice means in response to pressure of the oxygen flow therethrough.

8. The combination as recited in claim 7 wherein said nozzle head means includes a head portion and a stem portion and means for guiding movement of said stem portion.

9. The combination as recited in claim 8 wherein said stem portion includes a hollow stem opened at one end and said guiding means comprises a cylinder having one opened end slidably receiving said hollow stem and having support ribs attached to said casing in said mixture chamber.

10. The combination as recited in claim 9 wherein said cylinder includes biasing means acting on said hollow stem and adjusting means to adjust said biasing means.